United States Patent
Kheiri et al.

(10) Patent No.: US 9,934,029 B2
(45) Date of Patent: Apr. 3, 2018

(54) ANNOTATION DRIVEN REPRESENTATIONAL STATE TRANSFER (REST) WEB SERVICES

(75) Inventors: Haseem ul Haq Kheiri, Brampton (CA); Michael Chaves, Cary, NC (US)

(73) Assignee: Teradata US, Inc., Dayton, OH (US)

( * ) Notice: Subject to any disclaimer, the term of this patent is extended or adjusted under 35 U.S.C. 154(b) by 1474 days.

(21) Appl. No.: 12/638,568

(22) Filed: Dec. 15, 2009

(65) Prior Publication Data

US 2011/0145699 A1 Jun. 16, 2011

(51) Int. Cl.
| | | |
|---|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 9/44 | (2018.01) |

(52) U.S. Cl.
CPC .............. *G06F 8/76* (2013.01); *G06F 8/73* (2013.01); *G06F 17/2247* (2013.01)

(58) Field of Classification Search
CPC ........... G06F 17/2247; G06F 8/73; G06F 8/76
USPC ....................... 715/236, 234, 230
See application file for complete search history.

(56) References Cited

U.S. PATENT DOCUMENTS

| | | | |
|---|---|---|---|
| 6,476,833 B1 * | 11/2002 | Moshfeghi | 715/854 |
| 2007/0168922 A1 | 7/2007 | Kaiser | |
| 2008/0201234 A1 * | 8/2008 | Castro et al. | 705/26 |
| 2008/0288889 A1 * | 11/2008 | Hunt | G06Q 30/02 715/810 |
| 2009/0077477 A1 * | 3/2009 | Khan | G06F 8/74 715/760 |
| 2009/0193303 A1 * | 7/2009 | Giles et al. | 714/726 |
| 2009/0193393 A1 * | 7/2009 | Baldwin et al. | 717/115 |
| 2009/0235349 A1 * | 9/2009 | Lai | H04L 9/3213 726/14 |
| 2009/0300528 A1 * | 12/2009 | Stambaugh | 715/764 |
| 2009/0327421 A1 * | 12/2009 | Fu et al. | 715/234 |
| 2010/0083222 A1 * | 4/2010 | Maximilien | G06F 8/20 717/110 |

OTHER PUBLICATIONS

Battle, Robert et al. "Bridging the Semantic Web and Web 2.0 with Representational State Transfer (REST)" Feb. 2008.*
Mandel, Lawrence, "Describe REST Web services with WSDL 2.0", http://www.ibm.com/developerworks/webservices/library/ws-restwsdl/, (Accessed by client Dec. 7, 2009), 13 pgs.

* cited by examiner

*Primary Examiner* — Stephen Hong
*Assistant Examiner* — Nicholas Hasty
(74) *Attorney, Agent, or Firm* — Schwegman, Lundberg & Woessner, P.A.

(57) ABSTRACT

Techniques for annotation driven Representational State Transfer (REST) web services are presented. A platform-independent World-Wide Web application is annotated to expose the methods of the application when accessed via a WWW site. The methods are described when rendered via a WWW site in a REST compliant format (RESTful).

20 Claims, 3 Drawing Sheets

ANNOTATION DRIVEN REPRESENTATIONAL STATE TRANSFER (REST) WEB SERVICES

BACKGROUND

Increasingly, enterprises are providing their services and data to consumers over the Internet and the World-Wide Web (WWW). To do this, enterprises are developing separate interfaces that link their backend systems to a WWW interface.

A few popular techniques have emerged to assist enterprises in making the transition to the WWW easier.

A first technique is really an architectural approach and is referred to as Representational State Transfer (REST). WWW Interfaces that comply with REST are said to be "RESTful."

A REST interface is deployed for clients and servers to interact with one another over the Internet. Clients initiate requests that are processed by servers and responses are returned from the servers to the clients. Requests are in the form of nouns (resource identifiers) and verbs (actions) that are to be taken on the nouns. The vocabulary for the verbs are constrained to a few universal verbs, such as GET, PUT, POST, and DELETE. The nouns are used for uniquely identifying a resource over the Internet, such as by an Internet Protocol (IP) Address in the form of a Uniform Resource Locator (URL) link or Uniform Resource Identifier (URI).

Another popular technique is a communication protocol called Simple Object Access Protocol (SOAP). SOAP allows more customization than does RESTful interfaces.

That is, more feature/function can be achieved with greater developer control when actions (verbs) can be user-defined for any given situation, which are what SOAP permits. However, with the increased feature/function comes the loss of interoperability. That is, two or more resources (nouns) are harder to seamlessly interface with one another over the Internet when the potential actions (verbs) increase and are not controlled. Enterprises appear to prefer ease of integration over increased feature/function.

Thus, REST interfaces are growing in the industry at significant rates. REST is in fact replacing SOAP-based services as the preferred architecture of enterprises. One main reason for this is that the Application Programming Interface (API) for REST is easy to understand, constrained, and simple to use. This simplicity of integration also has some drawbacks.

For example, because REST interfaces are simplistic many feature/functions of enterprise provided services can be difficult to achieve, cumbersome, or lost entirely when transitioning to RESTful interfaces.

SUMMARY

In various embodiments, techniques for annotation driven Representational State Transfer (REST) web services are presented. According to an embodiment, a method for an annotation driven REST web service is presented. Specifically, a platform-independent Word-Wide Web (WWW) application (application) for a WWW site is identified. Then, one or more annotations, which are received from a developer, are integrated into the application. The one or more annotations describe and define selective aspects of the application as the application was originally provided. Finally, the one or more annotations are exposed as REST compliant methods (RESTful methods) for access via the WWW.

DETAILED DESCRIPTION

Figure 1:
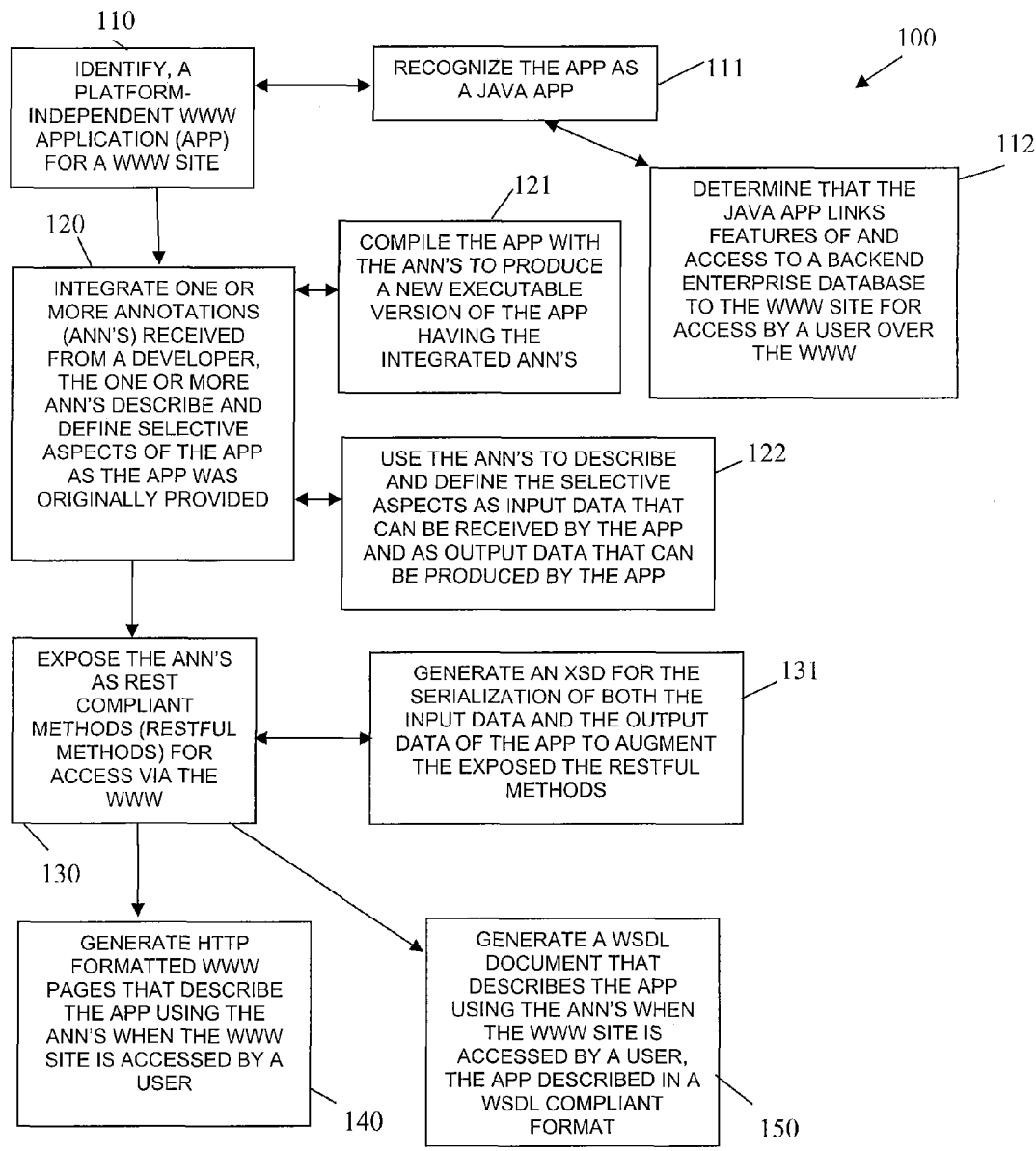
FIG. 1 is a diagram of a method for an annotation driven Representational State Transfer (REST) web service, according to an example embodiment.

FIG. 1 is a diagram of a method 100 for an annotation driven Representational State Transfer (REST) web service, according to an example embodiment. The method 100 (hereinafter "annotation-driven REST web service") is implemented in a machine-accessible or computer-readable storage medium as instructions that is executed by a machine (processing device (processor-enabled with memory; can also be a multiprocessor device) performs the processing depicted in FIG. 1. The machine specifically configured to process the annotation-driven REST web service. Moreover, the annotation-driven REST web service is operational and accessible over a network. The network may be wired, wireless, or a combination of wired and wireless. In an embodiment, the network is the Internet.

A variety of services are provided over the Internet and the World-Wide Web (WWW). Supplying data, images, and other types of data is relatively straight forward with the use of Hypertext Transfer Protocol (HTML) language or eXtensible Markup Language (XML).

However, when a WWW service provider (SP) wants to manipulate the data types and tie the data types and input to programs then more complicated applications are needed. These applications are most likely dependent on the hardware, operating system (OS), and/or WWW browser being used by the customer accessing a WWW site where the applications reside. Some approaches force the customer to load and install applications are their devices to account for this. Here, a customer defines or selects a version of an application that matches the customer's processing environment.

A more portable and platform independent approach is to provide the applications from the server of the WWW page itself in JAVA®, Microsoft.Net®, and others. These are essentially programming tools and execution environments that are portable and machine, browser, OS, and/or environment independent.

In JAVA®, another feature is available referred to as annotations. Annotations are metadata that are not part of the applications written in JAVA®. That is, they have no direct effect on the underlying applications but can augment compiling and what is additionally produced when the applications are executed. So, annotations can generate XML; instruct the compiler to generate the executable application with certain additional behaviors, and the like. Nearly, every piece of a program (application) can be annotated, such as classes, methods, variables, parameters, and packages. Again, the annotations are retained during the JAVA® compile process so they are embedded in the executable file and retrievable and usable at runtime by the JAVA® Virtual Machine (VM).

The idea of an annotation (metadata to enhance the compile and runtime processing) is not necessarily limited to JAVA®. That is, other platform-independent coding and execution environments can use statements that alter the compile and runtime processing of a service. For example, Microsoft.NET® also has an annotation facility.

So, although various embodiments discussed herein use JAVA® as examples it is noted that the invention is not so limited.

The term "service" may be used interchangeably and synonymously with the term "application" herein. An application or service are software instructions residing in a computer-readable storage medium and that are executed by a processor that is configured to execute the instructions.

The processing perspective of the annotation-driven REST web service describes how a RESTful service or (application) can be created, installed, and initiated on a web site for usage by other automated programs or users that access that web site. This is done in the manners discussed below using annotations to the application that is initiated and installed on the web site.

It is within this context that the processing associated with the FIG. 1 is now discussed.

At 110, the annotation-driven REST web service identifies a platform-independent WWW application for a WWW site. That is, a WWW service that runs a WWW site is identified as the platform-independent WWW application (application). The application provides services for an enterprise over the Internet via the WWW at the WWW site. The WWW site identified via a unique Internet Protocol (IP) address.

Identification can occur via a variety of mechanisms. For example, a developer can use a Graphical User Interface (GUI) or even a web interface to interact with the annotation-driven REST web service and provide a reference to the application. Again, it is the application that is being built and installed at the website for purposes of exposing the website and its methods in a RESTful manner. The application is to be annotated to achieve this and then built and installed on the website for use.

According to an embodiment, at 111, the annotation-driven REST web service recognizes the application as a JAVA® application.

Continuing with the embodiment of 111 and at 112, the annotation-driven REST web service determines that the JAVA® application links features of and access to a backend enterprise database to the WWW site for access by a user over the WWW via the IP address of the WWW site. In a particular case, the backend enterprise database is a data warehouse distributed by Teradata, Inc. of Miamisburg, Ohio. It is noted that this is but one scenario that can benefit from the teachings presented herein and it is presented for purposes of illustration. Other situations exists where a website is enhanced via annotations to the application/service that exposes and presents the website.

At 120, the annotation-driven REST web service integrates one or more annotations received from a developer. So, the developer provides the direction to integrate the annotations into the application. The one or more annotations describe and define selective aspects of the application as the application was originally provided. That is, a legacy platform-independent application that is not RESTful is annotated to make it RESTful, as described in greater detail herein and below.

In an embodiment, at 121, the annotation-driven REST web service compiles/builds the application with the annotations to produce a new executable version of the application having the integrated annotations. A particular implementation scenario for achieving this is described below at the end of the discussion of the FIG. 1 and before the discussion of the FIG. 2.

In another case, at 122, the annotation-driven REST web service uses the annotations to describe and define the selective aspects as input data that can be received by the application and as output data that can be produced by the application.

At 130, the annotation-driven REST web service exposes the annotations as REST compliant methods (RESTful methods) for access via the WWW.

According to a scenario, at 131, the annotation-driven REST web service generates an XML schema definition (XSD) for the serialization of both the input data and the output data of the application for purposes of augmenting the exposed RESTful methods.

In an embodiment, at 140, the annotation-driven REST web service generates HTTP formatted WWW pages that describe the application using the annotations when the WWW site is accessed by a user.

In another situation, at 150, the annotation-driven REST web service generates a Web Services Description Language (WSDL) document, which describes the annotations when the WWW site is accessed by a user. The application described in the WSDL document in a WSDL compliant format.

An example implementation and discussion of available features provided by the annotation-driven REST web service are now presented for further illustration and comprehension.

The techniques described herein specifically handle the issue of defining the interface to the Web Service (application) and connecting the Web Service interface to the underlying code that actually provides the Web Service functionality.

This sample implementation is described in terms of JAVA Enterprise Edition® (JEE) because some web applications are written in JAVA®. However, the teachings used have analogues in other languages (as discussed above), which are suitable for building web based applications (e.g., Microsoft.Net®).

The framework of the annotation-driven REST web service allows the interface to the Web Service to be defined by JAVA® annotations applied to the JAVA® interface, which actually supports the web service (application). This allows the web service definition to be written and carried with the code, which support the web service (application) as originally written.

The following annotations are used in the example illustration:

@RestfulWebService( ): Applied to an interface. Indicates that the annotated interface contains one or more web service methods.

Annotation Parameters:

rootAddress: Root address (URL) of this web service. RESTful web services are identified by a URL, the URL of the service is the root URL of the servlet (defined in web.xml as required by the JEE® specification)+"/"+the root address of the web service defined by this annotation.

@RestfulWebMethod( ): Applied to a method in an interface which has been annotated with @RestfulWebService. Indicates that the annotated method is also a RESTful web services method.

Annotation Parameters:

address: Address (URL) of this specific method of the web service. The full address of the web service method is the root address of the web service+"/"+this method address.

method: HTTP method (GET, POST, PUT, DELETE) which also identifies the web service.

contentType: Message payload mime type (e.g., text/xml)

description: Description of the web method used for the documentation page.

@RestfulWebParam( ): Applied to a parameter of a method which has been annotated with @RestfulWebMethod. Indicates that the method parameter is also a parameter to the web service.

Annotation Parameters:

name: Name of the parameter in the web method. This is normally the same as the name of the parameter in the JAVA® method, but is used because JAVA® does not save parameter names at runtime.

transport: Indicates where to find the parameter in the request. Values are: URL—the parameter is embedded in the main portion of the URL, queryParameter—the parameter is found in the URL query parameter, and messageBody—the parameter is encoded in the message body using the format specified by @RestfulWebMethod(contentType).

optional: Indicates that the parameter is optional. URL parameters cannot be optional.

@RestfulWebResult( ): Applied to the result of a method, which has been annotated with @RestfulWebMethod. Indicates that the return value of the method is also the return value of the web service.

Annotation Parameters:

preformatted: Indicates that the method result is already formatted and annotation-driven REST web service should not serialize the value using JAXB.

contentType: Return value mime type (normally text/xml)

When these annotations are used, the annotation-driven REST web service exposes the annotated interface methods as RESTful web service endpoints. As with any other RESTful web service, the annotation-driven REST web service web service can be called from various clients (browsers, javascript, Perl code, JAVA® applications, Microsoft Net® applications, etc.).

Using the information found in the annotations the annotation-driven REST web service generates HTML pages, which describe the web services. An overview page of all the web services is generated at the web services root address. A more detailed page is generated at the root address of each web service.

The annotation-driven REST web service also allows the automatic generation of the associated WSDL 2.0 document.

In an embodiment, the annotation-driven REST web service is implemented as a servlet and a RestfulEndpoint class. The RestfulEndpoint class has two properties: the annotated interface, and a class, which implements the annotated interface. When the RestfulEndpoint class is instantiated, it reads the annotations to set up the necessary information to allow the servlet to correctly identify the service class for each web service call.

For example, in some data warehouse products, instead of mapping the JAVA® class, which implements the web service as a Spring bean, RestfulEndpoint is mapped instead with the web service implementing class and the interface as parameters.

Prior solutions use SOAP to maintain features of web services that can be constrained when ported to RESTful Web Services. Herein, the existing web services are maintained and made RESTful via annotations on the web services.

Moreover, prior solutions, which support RESTful web services, require either special code to be written or XML documents to be written to define the Web Services interface and few if any support WSDL 2.0.

The techniques presented herein minimizes the effort required to build RESTful web services by minimizing the time required to define the Web Services interface, since the Web Service applications maintain existing code and are annotated to acquire RESTful compliance.

Additionally the techniques presented herein support both RESTful Web Services and WSDL 2.0 (as noted in some embodiments above).

Figure 2:
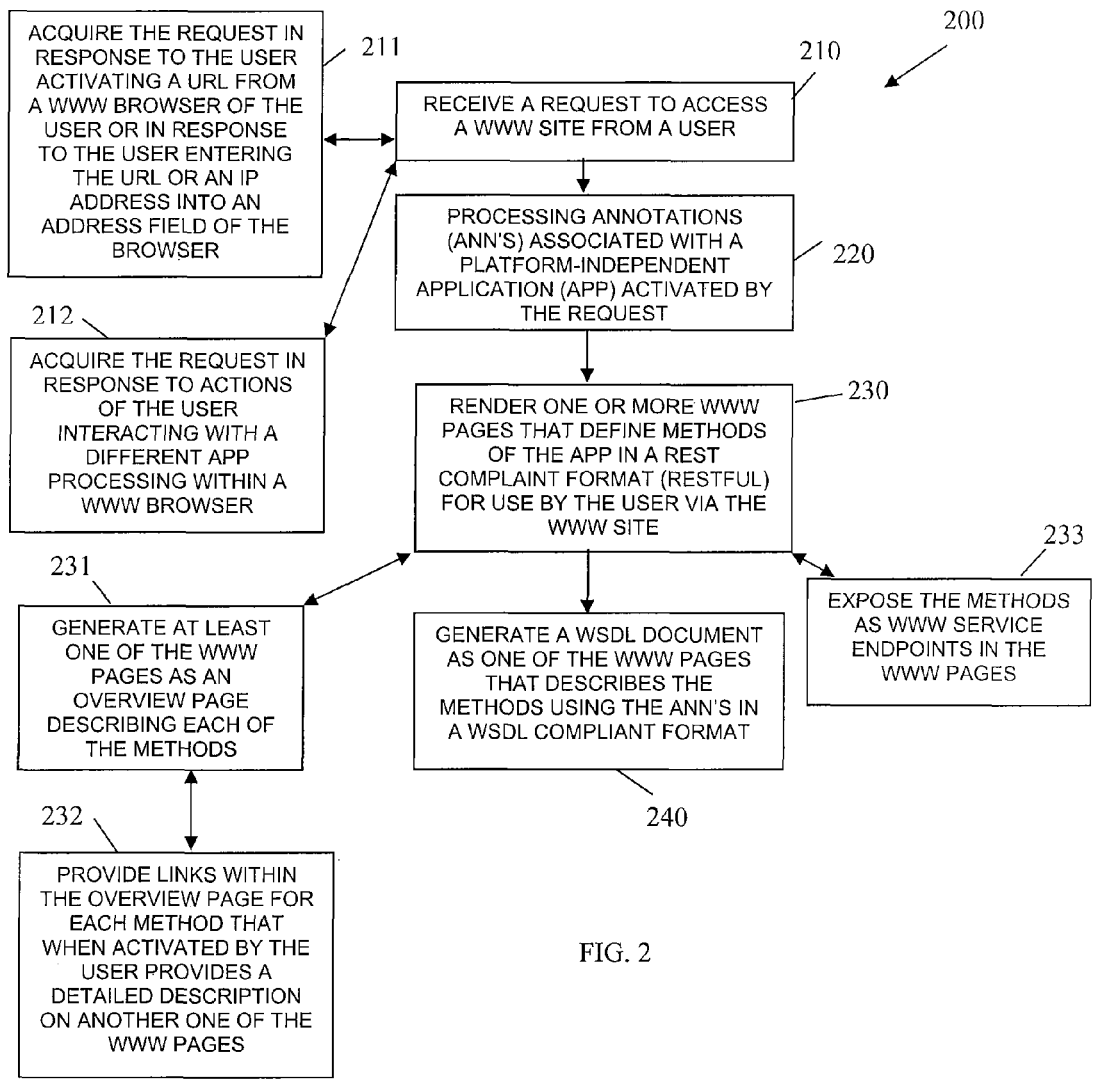
FIG. 2 is a diagram of another method for an annotation driven REST web service, according to an example embodiment.

FIG. 2 is a diagram of another method 200 for an annotation driven REST web service, according to an example embodiment. The method 200 (hereinafter "annotation-driven web service") is implemented in a machine-accessible or a computer-readable storage medium as instructions that are executed by a machine (one or more processors) and perform the processing reflected in FIG. 2. Again, the machine is specifically configured to process the annotation-driven web service. The annotation-driven web service is also accessible and operational over a network. The network may be wired, wireless, or a combination of wired and wireless. In an embodiment, the network is the Internet.

The annotation-driven web service presents another and in some cases an enhanced processing perspective to the annotation-driven REST web service represented by the method 100 of the FIG. 1. Specifically, the method 100 of the FIG. 1 describes initially set up of a RESTful web service (application) via annotations. Whereas, the method 200 of the FIG. 2 describes action of that web service when accessed over the WWW by a user or an automated program accessing the WWW site of the web service.

So, the FIG. 1 can be viewed as processing for initially set up, configuration, and implementation of the technique and the FIG. 2 can be viewed as processing after the web service (platform-independent WWW service) is installed and in operation and accessed at the WWW site by a user.

At 210, the annotation-driven web service receives a request to access a WWW site from a user. The request can be received in a variety of manners.

For example, at 211, the annotation-driven web service acquires the request in response to the user activating a URL from a WWW browser of the user. Alternatively, at 211, the annotation-driven web service acquires the request in response to the user entering the URL or an IP address for the web site into an address field of the browser.

In another case, at 212, the annotation-driven web service acquires the request in response to actions of the user interacting with a different application processing within the WWW browser of the user. In other words, the request can be generated by an application that a user accesses and/or interacts with from within the browser.

At 220, the annotation-driven web service processes annotations associated with a platform-independent application (web service) that is activated by the request.

At 230, the annotation-driven web service renders one or more WWW pages that define methods of the application in a REST compliant format (RESTful) for use by the user via the WWW site.

According to an embodiment, at 231, the annotation-driven web service generates at least one of the WWW pages as an overview page describing each of the methods.

Continuing with the embodiment of 231 and at 232, the annotation-driven web service provides links within the overview page for each method that when activated by the user provides a detailed description on another one of the WWW pages. This was described above with reference to the FIG. 1 with the discussion that followed the processing of the FIG. 1.

In another case, at 233, the annotation-driven web service exposes the methods as WWW service endpoints in the WWW pages.

In an embodiment, at 240, the annotation-driven web service generates a WSDL document as one of the WWW pages that describes the methods using the annotations in a WSDL compliant format. So, RESTful and WSDL formats can be rendered or can achieve compliance.

Figure 3:
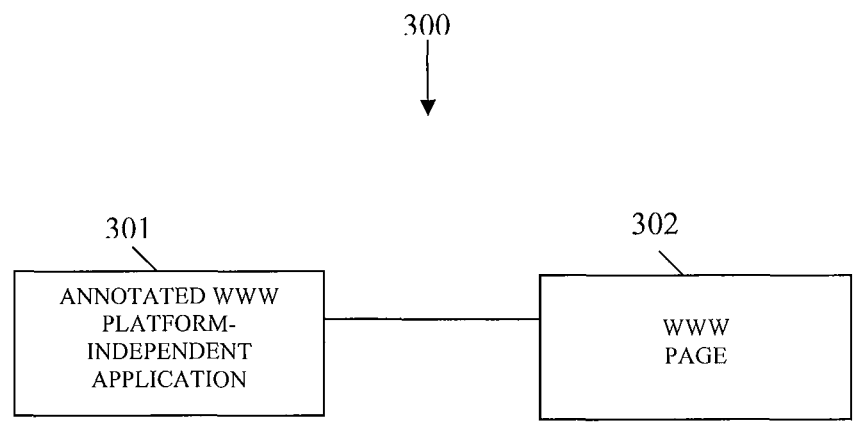
FIG. 3 is a diagram of an annotation driven REST web system, according to an example embodiment.

FIG. 3 is a diagram of an annotation driven REST web system 300, according to an example embodiment. The annotation driven REST web system 300 is implemented in a machine-accessible and/or computer-readable storage medium that is executed by one or more processors and is operational over a network. The network may be wired, wireless, or a combination of wired and wireless. In an embodiment, the network is the Internet.

In an embodiment, portions of the annotation driven REST web system 300 implements, among other things the annotation-driven REST web service and the annotation-driven web service represented by the methods 100 and 200 of the FIGS. 1 and 2, respectively.

The annotation driven REST web system 300 includes an annotated WWW platform-independent application (web service and referred to as "annotated application 301") and a WWW page 302. Each of these and their interactions with one another will now be discussed in turn.

The annotated application 301 is implemented in a computer-readable storage medium and executes on a processor of the network. Example aspects of the annotated application 301 were described above with reference to the methods 100 and 200 of the FIGS. 1 and 2, respectively.

The annotated application 301 is configured to generate the WWW page 302 in response to a user accessing a WWW site. Additionally, the annotated application 301 is configured to generate the WWW page 302 to define methods accessible via the WWW site in a REST compliant format (RESTful).

According to an embodiment, the annotated application 301 is further configured to generate a WSDL document describing each of the methods in a WSDL compliant format.

In still another situation, the annotated application 301 is configured to expose the methods as RESTful web service endpoints on the WWW page 302.

In another embodiment, the annotated application 301 is configured to generate the WWW page 302 as an overview page for all the methods. Each method having a link to another generated WWW page with a detailed RESTful description.

The WWW page 302 is implemented in a computer-readable medium and is accessible via a WWW browser that executes on a different processor of the network.

So, the WWW browser executes on a different processor from that of the annotated application 301 and is embedded within a processing device of the user. The network is the Internet.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and executed on a processing device, the method comprising:
    identifying, via a processing device, a platform-independent Word-Wide Web (WWW) application (application) for a WWW site;
    integrating, via the processing device, one or more annotations received from a developer, the one or more annotations describe and define selective aspects of the application as the application was originally provided; and
    exposing, via the processing device, the one or more annotations as Representational State Transfer (REST) compliant methods (RESTful methods) for access via the WWW, wherein the platform-independent WWW application was a legacy application that was not RESTful until the one or more annotations are integrated and exposed, and the legacy application maintains services and is made RESTful via the annotations, and wherein the annotations are metadata and not part of a source of the legacy application, the annotations have no direct effect on the legacy application but can augment compiling and augment what is additionally produced by the legacy application when the legacy application is executed, the metadata representing the annotations embedded in an executable version of the legacy application and retrieved at runtime for the executable version.

2. The method of claim 1 further comprising, generating, via the processing device, Hypertext Transfer Protocol (HTTP) formatted WWW pages that describe the application using the one or more annotations when the WWW site is accessed by a user.

3. The method of claim 1 further comprising, generating, via the processing device, a Web Services Description Language (WSDL) document that describes the application using the one or more annotations when the WWW site is accessed by a user, the application described in a WSDL compliant format.

4. The method of claim 1, wherein identifying further includes recognizing the application as a platform-independent application.

5. The method of claim 4, wherein recognizing further includes determining that the platform-independent application links features of and access to a backend enterprise database to the WWW site for access by a user over the WWW.

6. The method of claim 1, wherein integrating further includes compiling the application with the one or more annotations to produce a new executable version of the application having the integrated one or more annotations.

7. The method of claim 1, wherein integrating further includes using the one or more annotations to describe and define the selective aspects as input data that can be received by the application and as output data that can be produced by the application.

8. The method of claim 1, wherein exposing further includes generating an extensible markup language (XML) schema definition (XSD) for the serialization of both the input data and the output data of the application to augment the exposed the RESTful methods.

9. A method implemented in a computer-readable storage medium and executed by a processor, the method comprising:
   receiving, via the processor, a request to access a World-Wide Web (WWW) site from a user;
   processing, via the processor, annotations associated with a platform-independent application activated by the request; and
   rendering, via the processor, one or more WWW pages that define methods of the platform-independent application in a Representational State Transfer (REST) complaint format (RESTful) for use by the user via the WWW site, wherein the platform-independent application was a legacy application that was not RESTful until the annotations are processed and rendered, and the legacy application maintains services and is made RESTful via the annotations, and wherein the annotations are metadata and not part of a source of the legacy application, the annotations have no direct effect on the legacy application but can augment compiling and augment what is additionally produced by the legacy application when the legacy application is executed, the metadata representing the annotations embedded in an executable version of the legacy application and retrieved at runtime for the executable version.

10. The method of claim 9 further comprising, generating, via the processor, a Web Services Description Language (WSDL) document as one of the WWW pages that describes the methods using the one or more annotations in a WSDL compliant format.

11. The method of claim 9, wherein receiving further includes acquiring the request in response to the user activating a Uniform Resource Link (URL) from a WWW browser of the user or in response to the user entering the URL or an Internet Protocol (IP) address into an address field of the browser.

12. The method of claim 9, wherein receiving further includes acquiring the request in response to actions of the user interacting with a different application processing within a WWW browser.

13. The method of claim 9, wherein rendering further includes generating at least one of the WWW pages as an overview page describing each of the methods.

14. The method of claim 13, wherein generating further includes providing links within the overview page for each method that when activated by the user provides a detailed description on another one of the WWW pages.

15. The method of claim 8, wherein rendering further includes exposing the methods as WWW service endpoints in the WWW pages.

16. A processor-implemented system comprising:
   an annotated World-Wide Web (WWW) platform-independent application (annotated application) implemented in a computer-readable storage medium and to execute on a processor; and
   a WWW page implemented in a computer-readable medium and accessible via a WWW browser that executes on a different processor of a network;
   the annotated application configured to generate the WWW page in response to a user accessing a WWW site, the annotated application configured to generate the WWW page to define methods accessible via the WWW site in a Representational State Transfer (REST) complaint format (RESTful), wherein an application associated with the annotated application was a legacy application that was not RESTful until annotations are integrated into the application to form the annotated application, and the legacy application maintains services and is made RESTful via the annotations, and wherein the annotations are metadata and not part of a source of the legacy application, the annotations have no direct effect on the legacy application but can augment compiling and augment what is additionally produced by the legacy application when the legacy application is executed, the metadata representing the annotations embedded in an executable version of the legacy application and retrieved at runtime for the executable version.

17. The system of claim 16, wherein the annotated application is further configured to generate a Web Services Description Language (WSDL) document describing each of the methods in a WSDL compliant format.

18. The system of claim 16, wherein the annotated application is further configured to expose the methods as RESTful web service endpoints on the WWW page.

19. The system of claim 16, wherein the annotated application is further configured to generate the WWW page as an overview page for all of the methods, each method having a link to another generated WWW page with a detailed RESTful description.

20. The system of claim 16, wherein the WWW browser executes on the different processor that is embedded within a processing device of the user and the network is the Internet.

* * * * *